Oct. 30, 1934.                J. J. GROB                1,978,938
                              ELIMINATOR
                   Original Filed June 30, 1931
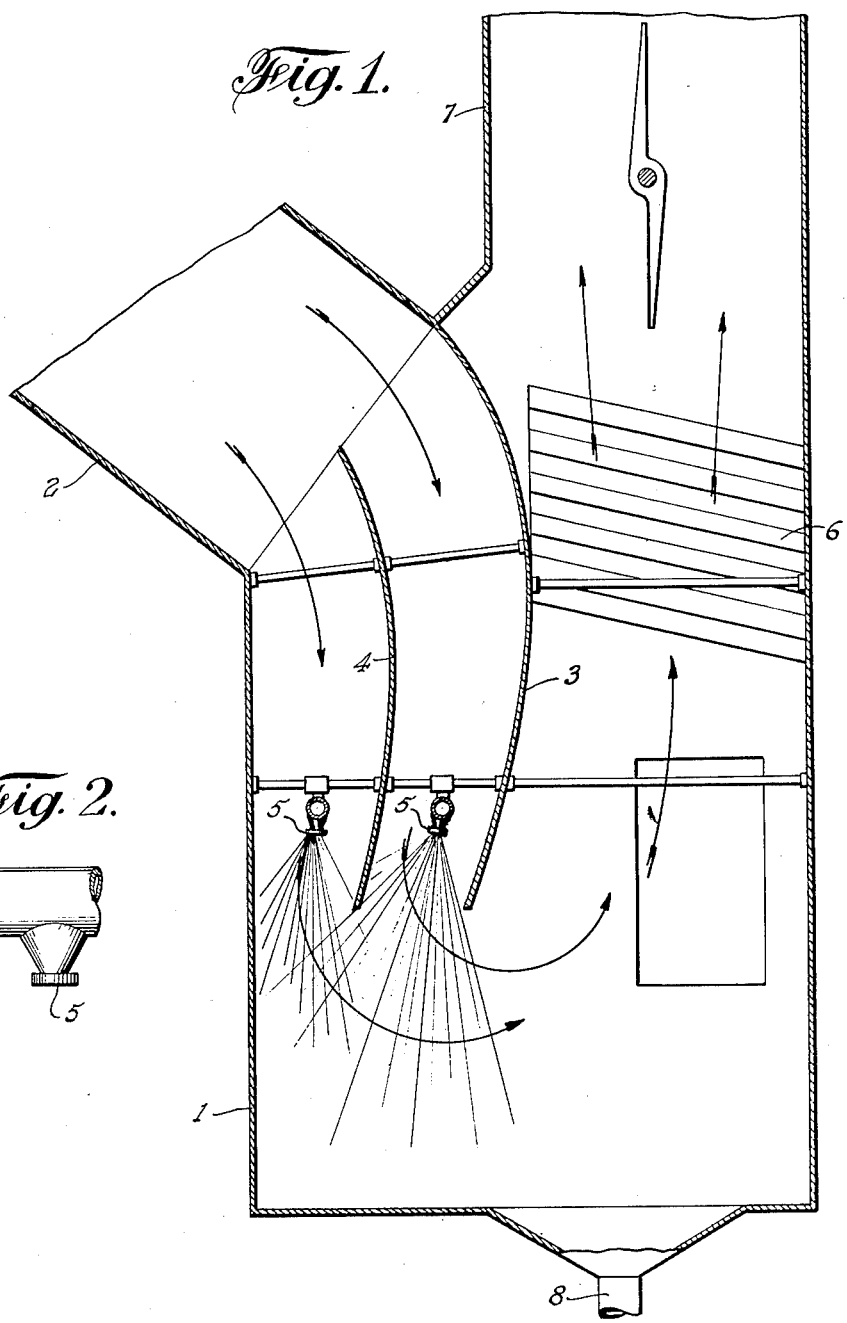
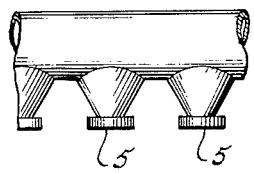
INVENTOR
John J. Grob
BY
Mitchell + Bechert
ATTORNEY Patented Oct. 30, 1934

1,978,938

UNITED STATES PATENT OFFICE 1,978,938

ELIMINATOR

John J. Grob, North Arlington, N. J.

Application June 30, 1931, Serial No. 547,879
Renewed July 20, 1933

5 Claims. (Cl. 183—24)

My invention relates to an eliminator for removing soluble gases and solid particles from a moving body of gas, and more particularly for removing soluble gases and soot, cinders, and ash from products of combustion.

It is the principal object of my invention to provide an efficient apparatus for separating soot, cinders, ash, and soluble gases from products of combustion.

Another object of my invention is to provide a device for this purpose which is simple in construction, cheap to manufacture, easy to assemble and place, and highly efficient for the purpose for which it is designed.

Other objects and features of invention will be apparent upon a reading of the specification taken in connection with the accompanying drawing.

Briefly stated, in a preferred form of the invention I provide means for diverting a current of smoke so that it will travel downward, means for spraying a liquid downward into the products of combustion while the products of combustion are traveling downward, and means for sharply changing the direction of the current of the products of combustion a short distance below the point where the spraying takes place. The liquid increases the mass of the solid particles in the products of combustion, and causes them to agglomerate and fall out of the current of the products of combustion. This effect is preferably increased by making the velocity of the liquid spray greater than the velocity of the gas so as to project the solid particles downward with sufficient velocity to throw them out of the current of the products of combustion.

In the drawing which shows, for illustrative purposes only, a preferred form of the invention—

Fig. 1 is a central vertical sectional view of an apparatus illustrative of the invention;

Fig. 2 is an enlarged view of the spraying nozzles,

In that form of my invention shown in the drawing 1 represents what I will term the "eliminator box". 2 represents a breeching leading from the furnace, the products of combustion from which are to be separated. 3 is a partition or baffle within the box, which extends from the breeching partway down into the box. One or more additional baffles 4 may be provided. These baffles are preferably curved and drawn in toward their lower ends so as to form progressively contracted passages through which the products of combustion flow. These products must necessarily become accelerated in speed as they proceed through these passages. 5—5 are nozzles, preferably within and closely adjacent to the outlet ends of these passages, the nozzles being positioned to direct sprays. It is preferable that the speed of the spray should be in excess of the speed of travel of the products of combustion adjacent thereto. 6—6 represent a plurality of eliminator plates for the elimination of entrained moisture and any uncaught solid particles. It will be observed that there is a relatively large space in the box below the outlet ends of the passages formed by the baffles. The effect produced by this construction is as follows: When the products of combustion flow in the direction of the arrows shown in Fig. 1, both the gaseous and the solid particles are accelerated in speed as they move downward through the passages formed by the baffles. This builds up momentum in the solid particles. As the products pass through the spray, fly dust and other solid particles are caused to agglomerate. The moment the products of combustion leave the passages formed by the baffles, they enter a relatively large space in the box, wherein the velocity of the gas is necessarily reduced. At the same time the direction of travel of the gaseous portion is changed quickly, so as to divert it laterally out of the path of travel of the solid particles, and upwardly and outwardly through the outlet duct 7. This change of pressure and direction chiefly affects the gaseous portion of the products of combustion while the great bulk of particles continue on in their downward direction toward the bottom of the box, in which position they accumulate. The accumulated solid particles and the water in the bottom of the box may be drawn off through an outlet 8.

From the foregoing it is apparent that, by the means described, the fly dust and solid portions contained in the products of combustion may be efficiently removed from the gaseous portions. If a fan should be used to assist the draft, it could be located in the outlet above the eliminator means 6.

It will be noted that the nozzles 5—5 are located substantially at the point of exit of the gases from their conducting means. The sprays practically fill the gas passage so that there is opportunity for a thorough wetting of the solid particles in the gases, but since the direction of flow of the gases is abruptly changed immediately after wetting there is insufficient time for excessive cooling of the gases before they reach the stack. Thus the draft is not greatly impaired and the water consumption is relatively low. By bringing dry gases substantially to the point of exit there is little or no chance of having agglomerated particles plastered on the sides of the gas passages.

The climactic effect produced by directing the comingled gases and spray downwardly at high velocity and then almost immediately lowering the velocity and abruptly changing the direction of flow of the gases results in an almost complete separation of gases and entrained solids.

While the invention has been described in considerable detail, I do not wish to be strictly limited to the form of apparatus herein described, since many changes may be made within the scope of the invention as defined in the appended claims.

I claim:

1. An eliminator, comprising a box, means for conducting products of combustion into said box from above through a plurality of downwardly directed passageways arranged side by side and contracted toward their exit ends, means for conducting off the gaseous portions of the products of combustion comprising an upwardly directed outlet passage at one side of said inlet passages, spraying means in the exit ends of said inlet passages arranged to direct a spray downwardly in the direction of travel of the products of combustion entering said box and opposite to the direction of travel of the gases entering said outlet passage, and means to permit the removal of the accumulation of the separated solid portions of said products in the bottom of said box.

2. An eliminator comprising a box, means for conducting dust laden gases into said box and causing the same to flow downwardly therein at a relatively high velocity, means for generating a liquid spray and directing the same in the downward direction of and into the flow of the gases while travelling downwardly and substantially at the point of exit of said gases from said first mentioned means, said spray being directed to substantially fill the exit space and substantially no space thereabove, and means positioned to cause an abrupt upturn in the direction of flow of said gases immediately after said liquid spray whereby solid particles and agglomerated small particles will be caused to separate themselves from the gases and fall to the bottom due to the climactic effect produced by the downward flow of gases and spray and decrease in velocity and abrupt change of direction of the gases in said box, and means to permit the removal of the accumulation of the separated solid particles.

3. An eliminator comprising a box, means for conducting products of combustion into said box at a relatively high velocity and in a downward direction, said box being substantially larger than said inlet conducting means whereby the velocity of said products in said box will be substantially reduced, means for spraying liquid into the stream of said products of combustion while at said relatively high velocity and substantially at the point of exit of said products from said conducting means and at substantially no point thereabove and in the direction of flow of said products at such high velocity, said spray being substantially coextensive with said stream at high velocity, said box having an outlet passage positioned to cause said products of combustion to suffer an abrupt turn of direction of flow in reaching said outlet passage and immediately after leaving said conducting means whereby solid particles and agglomerated small particles will be caused to fall to the bottom of said box due to the climactic effect produced by the downward flow of gases and spray and the loss of velocity and abrupt change of direction of said gases.

4. An eliminator comprising a box having inlet means for conducting products of combustion thereinto, said inlet means being contracted to increase the velocity of said products of combustion, means for spraying a liquid into said products of combustion while traveling at the increased velocity and in the same direction as the flow of said products of combustion and substantially at the exit from said inlet means so that the space substantially at said exit and substantially no point thereabove will be filled with mist through which said products must pass, said box being of greater area and volume than said inlet means whereby the velocity of said products of combustion on leaving said inlet means will be substantially reduced, and means for causing the gaseous portion of said products of combustion to suffer a sharp change of direction immediately after spraying for the purpose described, whereby solid particles and agglomerated small particles will be separated from the gaseous portions of said products by the climactic effect produced by the same direction of flow of spray and products and the loss of velocity and sharp change of direction of said products of combustion.

5. An eliminator comprising a box, inlet means for conducting products of combustion thereinto and in a generally downward direction, partition means within said inlet for dividing the stream of products of combustion entering said box, means for spraying a liquid into the stream of said products of combustion substantially at the exit of said inlet means and in the direction of the stream so as to cause substantially all of said products to pass through the spray, outlet means positioned to cause said products of combustion to suffer a sharp change of direction in said box, whereby solid particles and agglomerated small particles will be separated from the gaseous portions of said products by the climactic effect produced by the same direction of flow of said spray and products and the sharp change of direction of the gaseous portions of said products of combustion.

JOHN J. GROB.